United States Patent
Park et al.

(10) Patent No.: US 8,308,424 B2
(45) Date of Patent: Nov. 13, 2012

(54) POWER GENERATION SYSTEM USING HELICAL TURBINE

(75) Inventors: Jin-Soon Park, Gyeonggi-do (KR); Ki-Dai Yum, Seoul (KR); Kwang-Soo Lee, Seoul (KR); Sok-Kuh Kang, Gyeonggi-do (KR); Jae-Youll Jin, Gyeonggi-do (KR); Woo-Sun Park, Seoul (KR)

(73) Assignee: Korea Ocean Research And Development Institute, Ansan, Gyeonggi-Do (KR)

( * ) Notice: Subject to any disclaimer, the term of this patent is extended or adjusted under 35 U.S.C. 154(b) by 243 days.

(21) Appl. No.: 12/516,675

(22) PCT Filed: Nov. 27, 2007

(86) PCT No.: PCT/KR2007/006037
§ 371 (c)(1),
(2), (4) Date: Aug. 4, 2009

(87) PCT Pub. No.: WO2008/066313
PCT Pub. Date: Jun. 5, 2008

(65) Prior Publication Data
US 2010/0072752 A1    Mar. 25, 2010

(30) Foreign Application Priority Data
Nov. 28, 2006  (KR) .................. 10-2006-0118646

(51) Int. Cl.
*F03B 13/00*   (2006.01)
(52) U.S. Cl. .................. 415/71; 416/176; 290/54
(58) Field of Classification Search .............. 290/52
See application file for complete search history.

(56) References Cited

U.S. PATENT DOCUMENTS

| | | | | |
|---|---|---|---|---|
| 2,106,928 A | * | 2/1938 | Lee | 416/178 |
| 3,818,703 A | * | 6/1974 | Lapeyre | 60/504 |
| 4,412,417 A | * | 11/1983 | Dementhon | 60/497 |
| 4,494,007 A | * | 1/1985 | Gaston | 290/44 |
| 4,503,377 A | * | 3/1985 | Kitabayashi et al. | 318/807 |
| 4,625,125 A | | 11/1986 | Kuwabara | |
| 4,748,339 A | * | 5/1988 | Jamieson | 290/55 |
| 4,816,697 A | * | 3/1989 | Nalbandyan et al. | 290/54 |
| 5,760,515 A | * | 6/1998 | Burns | 310/115 |

(Continued)

FOREIGN PATENT DOCUMENTS

CN    2526525 Y    12/2002

(Continued)

OTHER PUBLICATIONS

Office Action for Chinese Application No. 200780043663.X, which is counterpart to U.S. Appl. No. 12/516,675.

(Continued)

*Primary Examiner* — Joseph Waks
(74) *Attorney, Agent, or Firm* — Edwards Wildman Palmer LLP

(57) ABSTRACT

A helical turbine power generation system is configured to generate electricity by using a helical turbine and an overload prevention generator. More specifically, the helical turbine is rotatably provided in a frame so as to continuously generate a rotation force under unidirectional or multidirectional fluid flow and a step-up gear is configured to increase the rotational velocity of the helical turbine up to a level required for generating electricity. Additionally, an overload prevention generator is incorporated to generate electricity by using the rotational velocity transferred from the step-up gear thereby preventing an overload caused by a sudden increase in the rotational velocity of the turbine.

6 Claims, 4 Drawing Sheets

U.S. PATENT DOCUMENTS

| | | | |
|---|---|---|---|
| 6,036,443 A * | 3/2000 | Gorlov | 416/176 |
| 7,156,609 B2 * | 1/2007 | Palley | 415/4.2 |
| 7,605,488 B2 * | 10/2009 | Rebsdorf | 290/44 |
| 7,753,644 B2 * | 7/2010 | Krippene | 415/4.2 |
| 7,902,687 B2 * | 3/2011 | Sauer et al. | 290/54 |
| 2002/0078687 A1 | 6/2002 | Donnelly | |
| 2004/0061337 A1 | 4/2004 | Becker | |
| 2007/0029807 A1 * | 2/2007 | Kass | 290/55 |
| 2009/0008937 A1 * | 1/2009 | Erdman et al. | 290/44 |
| 2009/0121482 A1 * | 5/2009 | Rickard | 290/44 |
| 2011/0027084 A1 * | 2/2011 | Rekret | 416/126 |
| 2011/0091312 A1 * | 4/2011 | Park et al. | 415/73 |
| 2011/0158789 A1 * | 6/2011 | Park et al. | 415/73 |

FOREIGN PATENT DOCUMENTS

| | | | |
|---|---|---|---|
| DE | 3542096 A1 * | 10/1987 | |
| GB | 2056183 A * | 3/1981 | |
| JP | H1-118164 | 8/1989 | |
| JP | 2004-104975 A | 4/2004 | |
| KR | 10-2004-0107166 A | 12/2004 | |
| KR | 10-2006-0014267 A | 2/2006 | |
| WO | 96-38667 A1 | 12/1996 | |
| WO | 99/07996 A1 | 2/1999 | |
| WO | WO 2007129049 A1 * | 11/2007 | |

OTHER PUBLICATIONS

International Search Report for PCT/KR2007/006037, mailed Mar. 10, 2008.

Office Action from Canadian Intellectual Property Office for Canadian Application No. 2,671,027, dated Sep. 19, 2011.

* cited by examiner

POWER GENERATION SYSTEM USING HELICAL TURBINE

CROSS-REFERENCES TO RELATED ART

This application is a 35 U.S.C. §371 U.S. national entry of International Application PCT/KR2007/006037 having an International Filing Date of Nov. 27, 2007 which is incorporated herein in its entirety.

Additionally, this application, also claims, under 35 U.S.C. §119(a), the benefit of Korean Patent Application No. 10-2006-0118646 filed on Nov. 28, 2006, the entire contents of which are incorporated herein by reference.

BACKGROUND OF THE INVENTION

1. Technical Field

The present invention relates to a power generation system using a helical turbine, and more particularly to a helical turbine power generation system, in which kinetic energy of a helical turbine obtaining a rotation force by tidal water flow energy can be converted into electrical energy by using a wound rotor induction generator.

2. Description of the Related Art

In general, a turbine refers to a machine or an apparatus for converting energy included in fluids (such as, water, gas, steam, etc.) into useful mechanical work. A system for generating tidal energy by using such a turbine is tidal power generation.

In conventional tidal power generation, a tidal power dam is built on a back bay of a high tidal range in order to block the movement of sea water, and then the difference of water level between inside and outside of the tidal power dam, which is generated by a tidal range, is used to generate electricity. This mechanism of the tidal power generation is similar to that of hydroelectric power generation.

However, the conventional tidal power generation uses potential energy, and thus, requires a water level above a certain height. Therefore, it is necessary to build a seawall causing environmental pollution problems including sea water pollution.

In addition, the construction of such a sea wall requires a long construction period, and accordingly high construction costs.

SUMMARY

The present invention has been made in view of the above-mentioned problems, and the present invention provides a helical turbine power generation system for generating electricity by a helical turbine obtaining a rotation force under unidirectional or multidirectional fluid flow. Also, the present invention provides a helical turbine power generation system for generating electricity through the use of an overload prevention generator.

In accordance with an aspect of the present invention, there is provided a helical turbine power generation system, the system including: a helical turbine rotatably provided in a frame so as to continuously generate rotation force under unidirectional or multidirectional fluid flow; a step-up gear for increasing a rotational velocity of the helical turbine up to a level required for generating electricity; and an overload prevention generator for generating electricity by using the rotational velocity transferred from the step-up gear, and for preventing overload caused by a sudden increase in a rotational velocity. Accordingly, it is possible to convert rotational motion generated by the helical turbine into electrical energy.

Advantageously, the helical turbine power generation system according to the present invention includes a helical turbine for generating rotation force, and thus does not require a tidal power dam used for a conventional structure. Accordingly, it is possible to reduce construction costs, and at the same time to prevent environmental pollution.

Also, an overload prevention generator used for generating electricity reduces equipment costs, and an overload prevention structure improves the functionality of the system.

In addition, the helical turbine further includes additional supporting members and additional blades, thereby improving rotational rate.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION

Hereinafter, a power generation system using a helical turbine according to a first embodiment of the present invention will be described with reference to the accompanying drawings.

Figure 1:
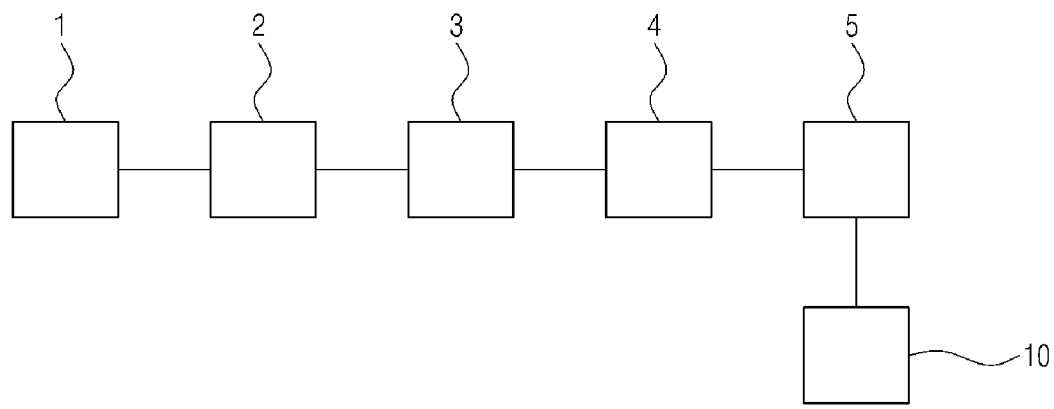
FIG. 1 is a schematic block diagram illustrating a helical turbine power generation system according to a first embodiment of the present invention.
Figure 2:
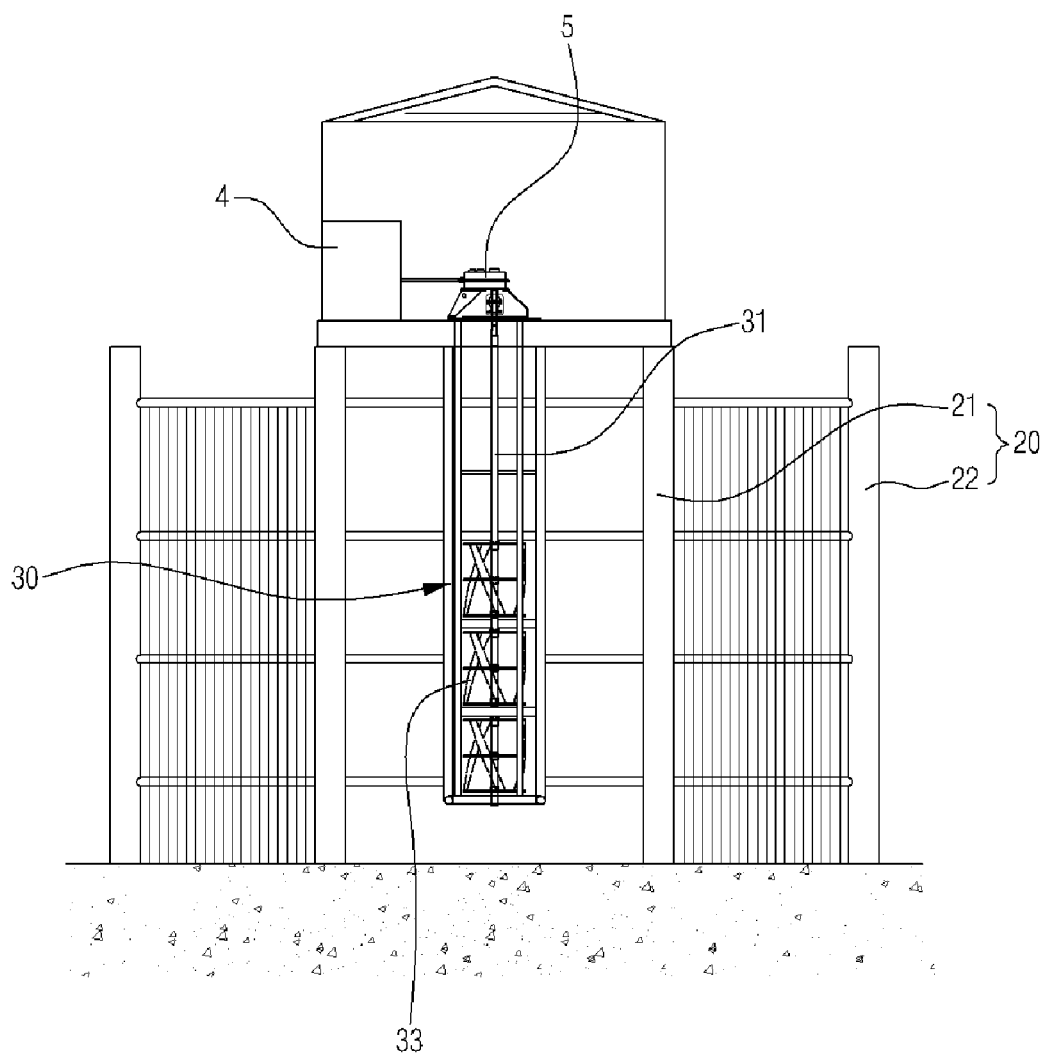
FIG. 2 is a cross-sectional view of a construction for installing the helical turbine shown in FIG. 1.
Figure 3:
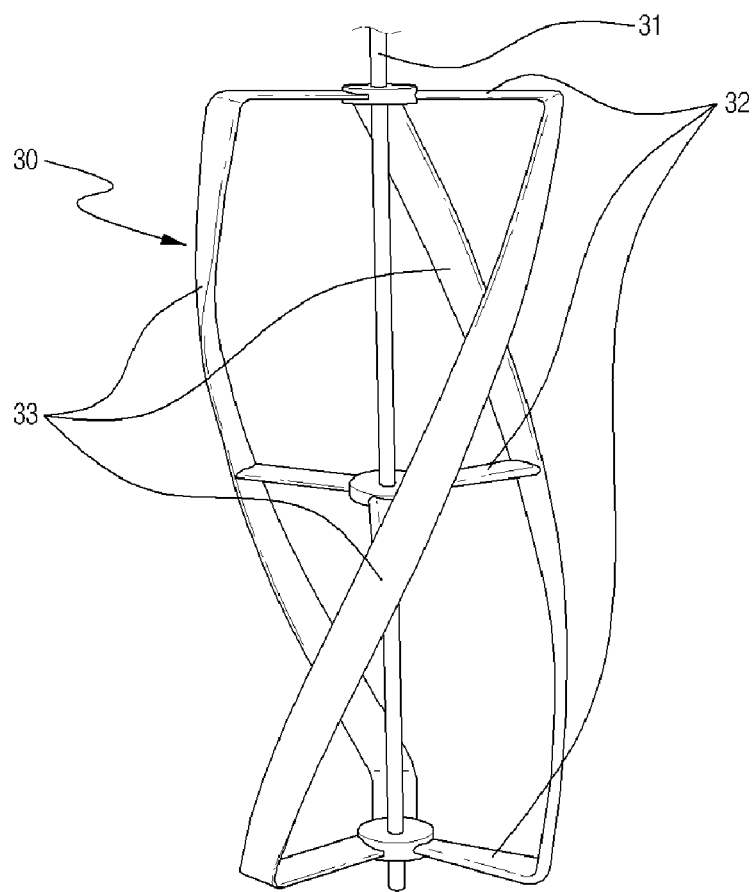
FIG. 3 is a perspective view illustrating the helical turbine shown in FIG. 2.
Figure 4:
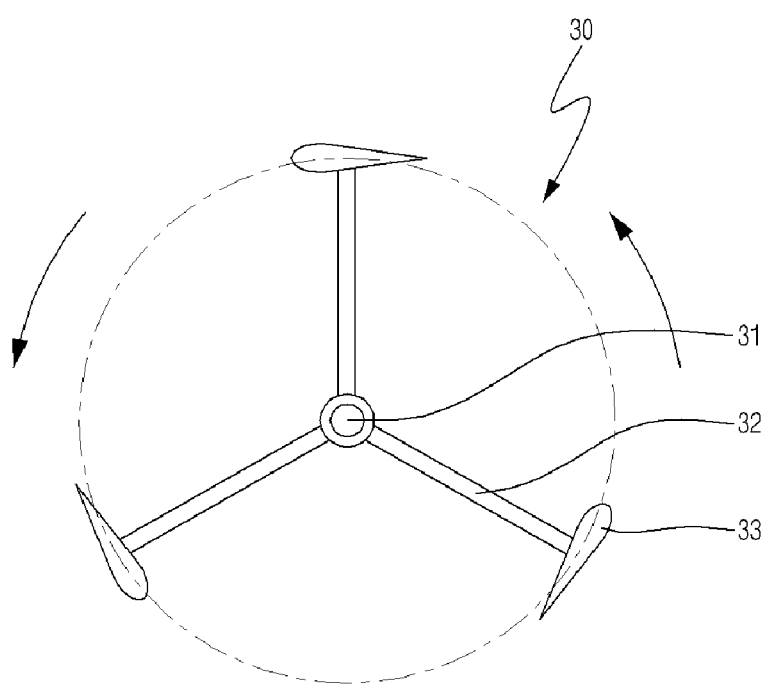
FIG. 4 is a cross-sectional view illustrating the helical turbine shown in FIG. 3.
Figure 5:
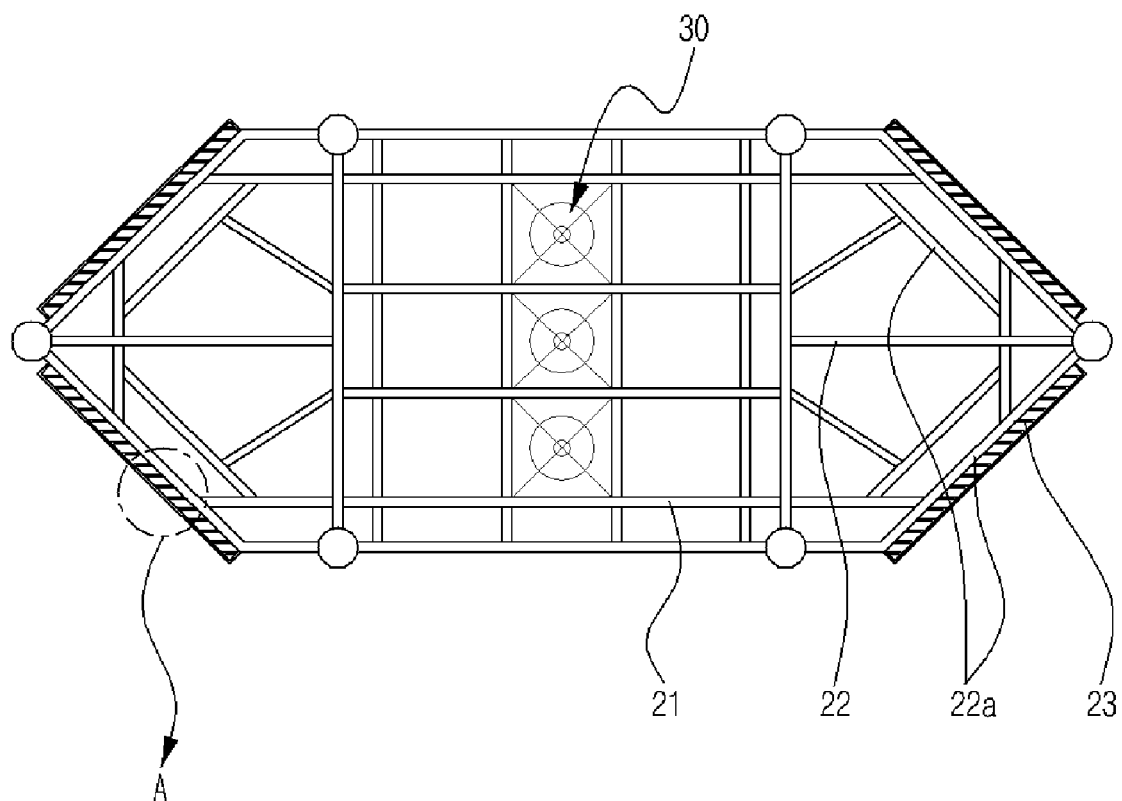
FIG. 5 is a plane view illustrating the frame shown in FIG. 2.
Figure 6:
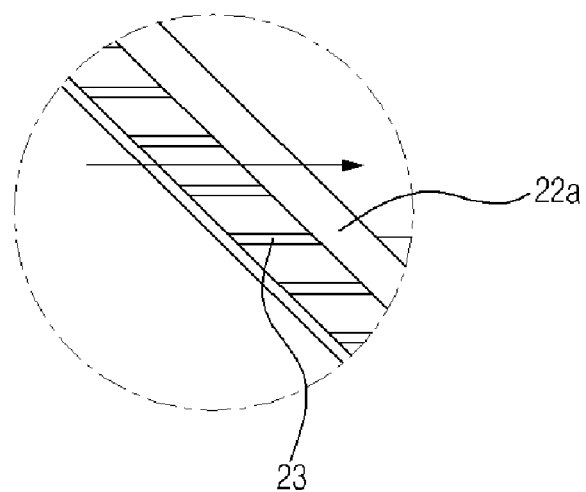
FIG. 6 is a partially enlarged cross-sectional view illustrating "A" shown in FIG. 5.

FIG. 1 is a schematic block diagram illustrating a helical turbine power generation system according to a first embodiment of the present invention; FIG. 2 is a cross-sectional view of a construction for installing the helical turbine shown in FIG. 1; FIG. 3 is a perspective view illustrating the helical turbine shown in FIG. 2; FIG. 4 is a cross-sectional view illustrating the helical turbine shown in FIG. 3; FIG. 5 is a plane view illustrating the frame shown in FIG. 2; FIG. 6 is a partially enlarged cross-sectional view illustrating "A" shown in FIG. 5.

As shown in the drawings, a helical turbine power generation system according to a first embodiment of the present invention includes: a helical turbine 30 rotatably provided in a frame 20 provided in fluid; a step-up gear 5 for increasing a rotational velocity of the helical turbine 30 up to a level required for generating electricity; an overload prevention generator for generating electricity by using the rotational velocity increased by the step-up gear 5, the generator having a function of preventing overload caused by a sudden increase in rotational velocity; a power converter 3 for converting the generated electricity into electricity with a constant voltage and constant frequency, the converter electrically being connected to the overload prevention generator; a transformer 2 for changing voltage or current, the transformer being connected to the power converter 3; and a system interconnection unit 1 for linking the electricity coming from the transformer 2 with a conventional power system. The overload prevention generator is a generator having a function of preventing overload, such as a wound rotor induction generator 4.

The helical turbine 30 includes: a shaft 31 rotatably supported by a frame 20; a plurality of supporting members 32 radially protruding from the shaft 31, in which a series of the supporting members are arranged in layers; and at least one blade 33 having a helical structure, in which the blade is connected to the ends of the multilayered respective supporting members 32, has a streamlined cross section, and twists in a longitudinal direction of the shaft 31.

The frame 20 includes: a fixing member 21 of a rectangular frame shape, which contains the helical turbine 30 and rotatably supports the rotation shaft 31; and a protruding member 22 including triangular frames on both sides in contact with fluid flow. On both protruding sloping sides 22a of the protruding member 22, a plurality of slits 23 parallel to the direction of the fluid flow are formed with equal spacing.

The process of operating a helical turbine power generation system as described above is as follows:

When fluid flows at a certain velocity, the helical turbine 30 rotates by the streamlined blade 33 of a helical structure. Herein, floating matter included in the fluid is filtered without passing through the slits 23. Also, since the middle portion of the protruding member 22 protrudes toward a direction of the fluid flow, the floating matter is caught on both sloping sides 22a without disturbing the fluid flow, and then is pushed to the ends of the sloping sides 22a by the fluid flow.

When rotation by the rotation shaft 31 (to which the blade 33 is fixed) is transferred to the step-up gear 5, the step-up gear 5 increases a rotational velocity of the rotation shaft 31 up to a level required for generating electricity. The rotational velocity increased by the step-up gear 5 is transferred to the wound rotor induction generator 4. The wound rotor induction generator 4 has a function of preventing the rotational velocity increased by the step-up gear 5 from increasing above a certain velocity, and thus prevents overload of the generator, which is caused by a sudden increase in rotational velocity.

The rotation force transferred to the wound rotor induction generator 4 is converted into electrical energy, thereby generating electricity, and the generated electricity is converted into high quality electricity with a constant voltage and constant frequency through the power converter 3. Also, through the transformer 2, voltage or current of the electricity is converted, and then the electricity coming from the transformer 2 is linked to a conventional power system by a system interconnection unit 1.

Figure 7:
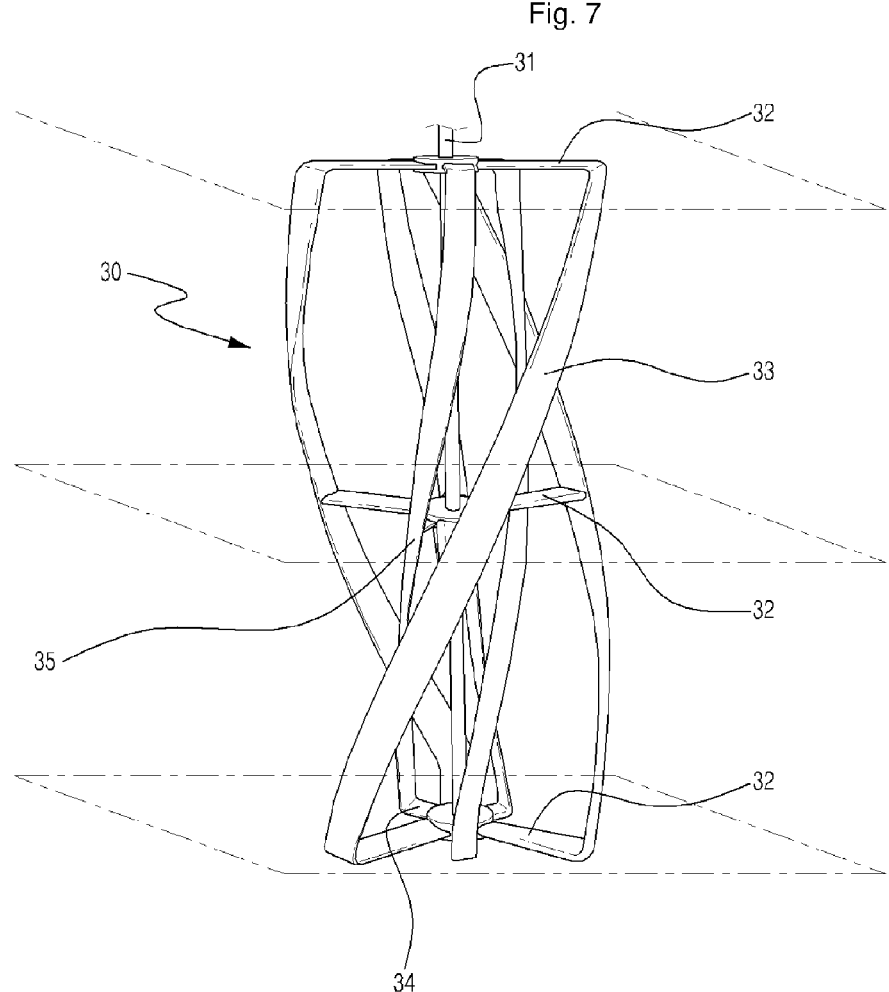
FIG. 7 is a perspective view illustrating a helical turbine in a helical turbine power generation system according to a second embodiment of the present invention.
Figure 8:
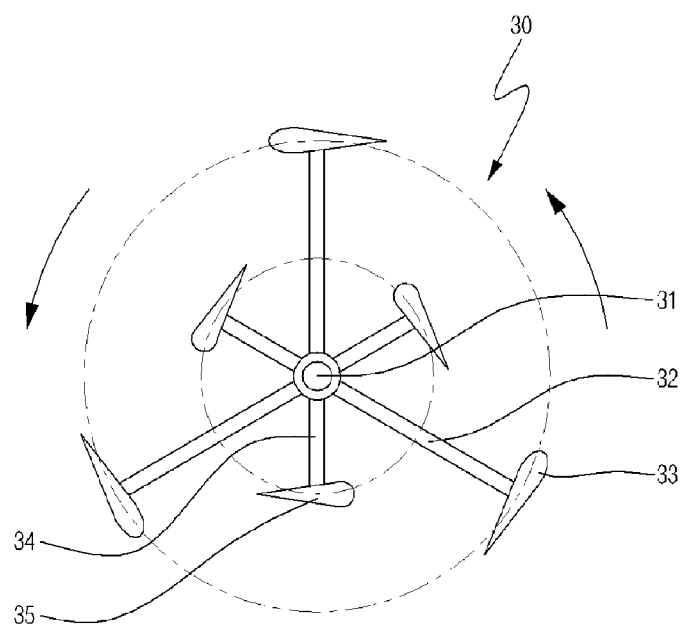
FIG. 8 is a cross-sectional view illustrating the helical turbine shown in FIG. 7.

In addition to the helical turbine 30 as described above, as shown in FIGS. 7 and 8, a helical turbine power generation system according to a second embodiment of the present invention further includes: a plurality of additional supporting members 34 radially protruding from the shaft 31, in which the additional supporting members 34 are shorter than the supporting members 32, alternate with the supporting members 32, and are multilayered in series; and at least one additional blade 35 having a helical structure, in which the blade is connected to the ends of the additional supporting members 34, has a streamlined cross section, and twists in a longitudinal direction of the shaft 31.

Accordingly, a helical turbine power generation system according to the second embodiment of the present invention, which additionally includes the supporting members 34 and the blade 35 provided in the helical turbine 30, can achieve a big rotation force according to fluid flow. Therefore, the present invention can improve rotation efficiency of a helical turbine power generation system.

As described above, in a helical turbine power generation system according to the present invention, the helical turbine 30 obtains a rotation force by fluid flow, and drives the wound rotor induction generator 4, thereby generating electricity. Therefore, it is possible to reduce equipment costs. Also, the step-up gear 5 mounted on the system makes it possible to generate a rotational velocity up to a level required for generating electricity, even at a low rate of fluid flow.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A helical turbine power generation system, the system comprising:
 a frame including:
  a fixing member rectangular in shape, and
  a protruding member including triangular frames on both sides in contact with the fluid flow, wherein the protruding member protrudes out perpendicular to a shaft of a helical turbine disposed in the fixing member, and
 the helical turbine rotatably provided vertically in the fixing member of the frame behind the protruding member, the helical turbine configured to continuously generate a rotation force under unidirectional or multidirectional fluid flow;
 a step-up gear rotatably connected to the helical turbine to increase a rotational velocity of the helical turbine up to a level required for generating electricity; and
 an induction generator connected to the step up gear to generate electricity by using the rotational velocity transferred from the step-up gear, wherein the helical turbine further comprises: a plurality of additional supporting members radially protruding from the shaft, in which the additional supporting members are shorter than the supporting members, alternate with the supporting members, and are multilayered in series; and at least one additional blade having a helical structure, in which the additional blade is connected to ends of the additional supporting members, has a streamlined cross section, and twists in a longitudinal direction of the shaft, and wherein
 the triangular frames on both sides in contact with the fluid flow, prevent floating matter included from attaching to the fixing member and a plurality of slits parallel to a direction of the fluid flow, which are formed on both protruding sloping sides of the protruding member, the plurality of slits are configured to prevent matter floating in the fluid from disturbing fluid flow.

2. The system as claimed in claim 1, wherein the induction generator is a wound rotor induction generator.

3. The system as claimed in claim 2, wherein the helical turbine comprises: a shaft rotatably supported by the frame; a plurality of supporting members radially protruding from the shaft, in which a series of the supporting members are multilayered; and at least one blade having a helical structure, in which the blade is connected to ends of the supporting members, has a streamlined cross section, and twists in a longitudinal direction of the shaft.

4. The system as claimed in claim 1, wherein the induction generator further comprises: a power converter for converting the electricity generated by the induction generator into high quality electricity with a constant voltage and constant frequency; a transformer for changing voltage or current; and a system interconnection unit for linking the generated electricity with a conventional power system.

5. The system as claimed in claim 1, wherein the induction generator further comprises: a power converter for converting the electricity generated by the induction generator into high quality electricity with a constant voltage and constant frequency; a transformer for changing voltage or current; and a system interconnection unit for linking the generated electricity with a conventional power system.

6. A method comprising:
 receiving a unidirectional or multidirectional fluid flow at a certain velocity through a plurality of slits in a fixed frame of a helical power generation system;
 preventing, by the plurality of slits, floating matter included in fluid from attached to a fixing member in the frame
 operating, by the fluid flow passing through the plurality of slits, a helical turbine;
 continuously generating, by the helical turbine, a rotation force under unidirectional or multidirectional fluid flow;
 increasing a rotational velocity of the helical turbine, by a step-up gear, up to a level required for generating electricity; and
 generating, by an induction generator, electricity by using rotational velocity transferred from the step-up gear,
 wherein the helical turbine includes a plurality of additional supporting members radially protruding from a shaft, in which the additional supporting members are shorter than the supporting members, alternate with the supporting members, and are multilayered in series; and at least one additional blade having a helical structure, in which the additional blade is connected to ends of the additional supporting members, has a streamlined cross section, and twists in a longitudinal direction of the shaft, and wherein
the triangular frames on both sides in contact with a fluid flow, prevent floating matter included from attaching to the fixing member and a plurality of slits parallel to a direction of the fluid flow, which are formed on both protruding sloping sides of the protruding member, the plurality of slits are configured to prevent matter floating in the fluid from disturbing fluid flow.

* * * * *